United States Patent
Kitano

(10) Patent No.: US 7,579,800 B2
(45) Date of Patent: Aug. 25, 2009

(54) MOTOR CONTROL METHOD AND DEVICE THEREOF

(75) Inventor: Nobuki Kitano, Kusatsu (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/530,410

(22) PCT Filed: Oct. 10, 2003

(86) PCT No.: PCT/JP03/13017

§ 371 (c)(1),
(2), (4) Date: Apr. 7, 2005

(87) PCT Pub. No.: WO2004/034563

PCT Pub. Date: Apr. 22, 2004

(65) Prior Publication Data

US 2006/0125437 A1    Jun. 15, 2006

(30) Foreign Application Priority Data

Oct. 11, 2002    (JP) .............................. 2002-298319

(51) Int. Cl.
    *H02P 7/00*    (2006.01)
(52) U.S. Cl. ...................... 318/432; 318/434; 318/461; 318/798; 318/799; 318/809
(58) Field of Classification Search ................. 318/629, 318/461, 798, 799, 809, 432–434, 804
    See application file for complete search history.

(56) References Cited

U.S. PATENT DOCUMENTS

| | | | | |
|---|---|---|---|---|
| 5,402,054 A | * | 3/1995 | Eckersley | 318/801 |
| 5,548,199 A | * | 8/1996 | Bidaud et al. | 318/802 |
| 6,051,952 A | * | 4/2000 | Moreira et al. | 318/738 |
| 6,208,109 B1 | * | 3/2001 | Yamai et al. | 318/716 |
| 6,359,405 B1 | * | 3/2002 | Tsurumi | 318/434 |
| 6,422,331 B1 | * | 7/2002 | Ochiai et al. | 180/65.2 |
| 6,646,411 B2 | * | 11/2003 | Hirono et al. | 318/801 |
| 6,700,343 B2 | * | 3/2004 | Masaki et al. | 318/434 |
| 6,737,828 B2 | * | 5/2004 | Kiuchi et al. | 318/779 |
| 6,822,417 B2 | * | 11/2004 | Kawaji et al. | 318/701 |
| 7,075,260 B2 | * | 7/2006 | Maeda | 318/443 |

FOREIGN PATENT DOCUMENTS

JP    04-049894 A    2/1992

(Continued)

*Primary Examiner*—Bentsu Ro
*Assistant Examiner*—Erick Glass
(74) *Attorney, Agent, or Firm*—Global IP Counselors, LLP

(57) ABSTRACT

A motor control apparatus comprises the amplitude adjustment section and the peak voltage control section so as to adjust the torque control output in correspondence with the output voltage of the inverter. The peak voltage control section detects the peak voltage of the voltage command, and outputs the adjustment command instructing the amplitude adjustment section to suppress the amplitude when the peak voltage possibly exceed the previously determined value which is determined with respect to the maximum output voltage or maximum modulation rate of the inverter. The amplitude adjustment section lowers the gain by carrying out processing such that a constant proportional value is removed from the integration value, for example, in response to the supplying of the adjustment command.

21 Claims, 6 Drawing Sheets

FOREIGN PATENT DOCUMENTS

| | | |
|---|---|---|
| JP | 07-177793 A | 7/1995 |
| JP | 07-193910 A | 7/1995 |
| JP | 10-174488 A | 6/1998 |
| JP | 10-243683 A | 9/1998 |
| JP | 11-178388 A | 7/1999 |
| JP | 2000-041397 A | 2/2000 |
| JP | 2000-236690 A | 8/2000 |
| JP | 2001-37281 A | 2/2001 |
| JP | 2001-119981 A | 4/2001 |
| JP | 2001-286179 A | 10/2001 |
| JP | 2002-095263 A | 3/2002 |
| JP | 2002-142483 A | 5/2002 |

* cited by examiner

MOTOR CONTROL METHOD AND DEVICE THEREOF

CROSS-REFERENCE TO RELATED APPLICATIONS

This nonprovisional application claims priority under 35 U.S.C. §119(a) to Japanese Patent Application Nos. 2002-298319, filed in Japan on Oct. 11, 2002, the entire contents of which is hereby incorporated by reference.

TECHNICAL FIELD

This invention relates to a motor control method and apparatus thereof for controlling voltages or currents applied to a motor from an inverter so as to suppress rotation speed variation of the motor which drives a periodical load.

BACKGROUND ART

As a compressor, there exist a 1-cylinder compressor and a 2-cylinders compressor. The 1-cylinder compressor among them has advantages such that a number of components of the compressor is small and that a cost of the compressor is cheap while the 1-cylinder compressor has disadvantage such that vibration of the compressor is greater so that stable operation of the compressor is difficult because the 1-cylinder compressor has greater load torque variation.

Therefore, it is desired that a 1-cylinder compressor is driven with vibration as small as possible, with efficiency as high as possible, and with stability. It is also desired that an arrangement is employed so as to realize performance of an inverter fully, and that the inverter is made with a cost as cheap as possible.

By taking them into consideration, it is proposed from the past that torque controlling is carried out so as to determine speed variation value as great as possible within an extent where decreasing amount in efficiency is suppressed to be equal or less than a predetermined value and vibration does not matter in practice (refer to Japanese Patent Laid-Open Publication No. H10-174488 gazette).

It is also proposed that torque ripple correction amount is decreased following becoming greater of the speed, and that torque ripple correction amount is adjusted corresponding to a peak value of a ripple of a current which flows an inverter (refer to Japanese Patent Laid-Open Publication No. 2001-119981 gazette).

SUMMARY OF THE INVENTION

When the motor control method (hereinafter referred to as torque control) is carried out at high speed rotation so as to sufficiently suppress rotation speed variation, the method controlling voltages or currents applied to a motor from an inverter for changing motor output torque so as to suppress rotation speed variation of the motor which drives periodic load, a disadvantage arises in that a command voltage becomes a command voltage which is equal to or greater than a voltage which can be output from an inverter and the output voltage becomes saturated, therefore the current control becomes unstable, the torque control diverges, consequently the current control becomes non-following condition so that the motor will stop.

When load is light and the rotation speed is a low speed, a voltage required for driving a motor is low, so that when PWM (pulse width modulation) driving of an inverter is carried out, a pulse width becomes shorter consequently the affection due to the dead time becomes greater. When the torque control is further carried out for this operation, a situation occurs where the pulse width becomes further shorter so that positional sensor-less control of a motor and current control may become unstable.

When load is light, sound, vibration do not matter, and the torque control is unnecessarily carried out for some cases. But, when the torque control is continuously carried out, the efficiency becomes worse instead.

When the torque control is sufficiently carried out, minus current flowing in a direct current section of an inverter becomes greater. Therefore, when the current flowing in the direct current section of the inverter is detected and when detection extent of the minus current is insufficient, the current exceeds the detection extent in a negative side so that situation where the current cannot be detected. Consequently, disadvantages arise in that the current control becomes unstable, the torque control diverges, and the motor stops.

The present invention was made in view of the above problems.

It is a first object of the present invention to provide a motor control method and apparatus thereof which can adjust torque control output in correspondence with an output voltage of an inverter.

It is a second object of the present invention to provide a motor control method and apparatus thereof which can adjust torque control output so as not to exceed detection limit of a current sensor.

It is a third object of the present invention to provide a motor control method and apparatus thereof which can turn off torque control when load is light.

A motor control method of a first aspect of the present invention is a method for detecting an output voltage value or command value of an inverter, and for controlling a voltage or current of the inverter based upon the detection value so that the output voltage value or command value of the inverter does not exceed a predetermined value, when a voltage or current applied to a motor from the inverter is controlled so as to suppress rotation speed variation of the motor which drives periodic load.

A motor control method of a second aspect of the present invention is a method for detecting an output voltage value or command value of an inverter, and for controlling a voltage or current of the inverter based upon the detection value so that the output voltage value or command value of the inverter does not exceed a predetermined value, taking precedence over suppression of rotation speed variation, when a voltage or current applied to a motor from the inverter is controlled so as to change motor output torque for suppressing rotation speed variation of the motor which drives periodic load.

A motor control method of a third aspect of the present invention is a method for employing a peak value of the output voltage value of the inverter or the command value as the detection value.

A motor control method of a fourth aspect of the present invention is a method for decreasing an amplitude of an output torque variation of a motor, and for controlling a voltage or current of an inverter so that the output voltage value or command value of the inverter does not exceed a predetermined value, when a voltage or current applied to the motor from the inverter is controlled so as to change motor output torque for suppressing rotation speed variation of the motor which drives periodic load.

A motor control method of a fifth aspect of the present invention is a method for detecting a current of an inverter using a current detection section, and for controlling a voltage or current of the inverter based upon the current detection value so as not to exceed the current detection extent, when a voltage or current applied to a motor from the inverter is controlled so as to suppress rotation speed variation of the motor which drives periodic load. Wherein, the current of the inverter may be an output current or an input current.

A motor control method of a sixth aspect of the present invention is a method for detecting a current of an inverter using a current detection section, and for controlling a voltage or current of the inverter based upon the current detection value so as not to exceed the current detection extent, for driving a motor, when a voltage or current applied to the motor from the inverter is controlled so as to change motor output torque for suppressing rotation speed variation of the motor which drives periodic load.

A motor control method of a seventh aspect of the present invention is a method for decreasing an amplitude of an output torque variation of a motor, and for controlling a voltage or current of an inverter so as not to exceed the current detection extent, when a voltage or current applied to the motor from the inverter is controlled so as to change motor output torque for suppressing rotation speed variation of the motor which drives periodic load.

A motor control method of an eighth aspect of the present invention is a method for indirectly detecting the output current of the inverter by detecting the input current of the inverter using the current detection section, and for controlling the voltage or current of the inverter so that the peak value of the input current of the inverter in negative side does not exceed a predetermined value.

A motor control method of a ninth aspect of the present invention is a method for detecting or estimating load, and for not suppressing rotation speed variation of a motor in correspondence with the load being smaller than a predetermined value, when a voltage or current applied to the motor from an inverter is controlled so as to change motor output torque for suppressing rotation speed variation of the motor which drives periodic load.

A motor control method of a tenth aspect of the present invention is a method for detecting or estimating load by means of an average current.

A motor control method of an eleventh aspect of the present invention is a method for detecting an output voltage value or command value of an inverter, and for controlling a voltage or current of the inverter based upon the detection value so that the output voltage value or command value of the inverter does not exceed a predetermined value, when a converter is provided which can control a direct current voltage which is supplied to the inverter, and when a voltage or current applied to a motor from the inverter is controlled so as to change motor output torque for suppressing rotation speed variation of the motor which drives periodic load.

A motor control method of a twelfth aspect of the present invention is a method for controlling the direct current voltage supplied to the inverter based upon the detection value.

A motor control apparatus of a thirteenth aspect of the present invention for controlling a voltage or current applied to a motor from an inverter so as to suppress rotation speed variation of the motor which drives periodic load, comprises a detection section for detecting an output voltage value or command value of the inverter, and an inverter control section for controlling a voltage or current of the inverter based upon the detection value so that the output voltage value or command value of the inverter does not exceed a predetermined value.

A motor control apparatus of a fourteenth aspect of the present invention for controlling a voltage or current applied to a motor from an inverter so as to change motor output torque for suppressing rotation speed variation of the motor which drives periodic load, comprises a detection section for detecting an output voltage value or command value of the inverter, and an inverter control section for controlling a voltage or current of the inverter based upon the detection value so that the output voltage value or command value of the inverter does not exceed a predetermined value, taking precedence over suppression of rotation speed variation.

A motor control apparatus of a fifteenth aspect of the present invention employs a peak value of the output voltage value of the inverter or the command value as the detection value.

A motor control apparatus of a sixteenth aspect of the present invention for controlling a voltage or current applied to a motor from an inverter is controlled so as to change motor output torque for suppressing rotation speed variation of the motor which drives periodic load, comprises an inverter control section for decreasing an amplitude of an output torque variation of the motor, and for controlling a voltage or current of the inverter so that the output voltage value or command value of the inverter does not exceed a predetermined value.

A motor control apparatus of a seventeenth aspect of the present invention for controlling a voltage or current applied to a motor from an inverter is controlled so as to suppress rotation speed variation of the motor which drives periodic load, comprises a current detection section for detecting a current of the inverter, and an inverter control section for controlling a voltage or current of the inverter based upon the current detection value so as not to exceed the current detection extent. Wherein, the current of the inverter may be an output current or an input current.

A motor control apparatus of an eighteenth aspect of the present invention for controlling a voltage or current applied to a motor from an inverter so as to change motor output torque for suppressing rotation speed variation of the motor which drives periodic load, comprises a current detection section for detecting a current of the inverter, and an inverter control section for controlling a voltage or current of the inverter based upon the current detection value so as not to exceed the current detection extent, for driving the motor.

A motor control apparatus of a nineteenth aspect of the present invention for controlling a voltage or current applied to a motor from an inverter so as to change motor output torque for suppressing rotation speed variation of the motor which drives periodic load, comprises an inverter control section for decreasing an amplitude of an output torque variation of the motor, and for controlling a voltage or current of the inverter so as not to exceed the current detection extent.

A motor control apparatus of a twentieth aspect of the present invention employs a section for indirectly detecting the output current of the inverter by detecting the input current of the inverter as the current detection section, and employs a section for controlling a voltage or current of the inverter so that the peak value of the input current of the inverter in negative side does not exceed a predetermined value as the inverter control section.

A motor control apparatus of a twenty-first aspect of the present invention for controlling a voltage or current applied to a motor from an inverter so as to change motor output torque for suppressing rotation speed variation of the motor which drives periodic load, comprises a load detection section for detecting or estimating load, and an inverter control section for not suppressing rotation speed variation of the motor in correspondence with the load being smaller than a predetermined value.

A motor control apparatus of a twenty-second aspect of the present invention employs a section for detecting or estimating load by means of an average current as the load detection section.

A motor control apparatus of a twenty-third aspect of the present invention having a converter which can control a direct current voltage which is supplied to an inverter, and for controlling a voltage or current applied to a motor from the inverter so as to change motor output torque for suppressing rotation speed variation of the motor which drives periodic load, comprises a detection section for detecting an output voltage value or command value of the inverter, and an inverter control section for controlling a voltage or current of the inverter based upon the detection value so that the output voltage value or command value of the inverter does not exceed a predetermined value.

A motor control apparatus of a twenty-fourth aspect of the present invention further comprises a direct current voltage control section for controlling the direct current voltage supplied to the inverter based upon the detection value.

When the motor control method of the first aspect of the present invention is employed, the method detects the output voltage value or command value of the inverter, and controls the voltage or current of the inverter based upon the detection value so that the output voltage value or command value of the inverter does not exceed the predetermined value, when the voltage or current applied to the motor from the inverter is controlled so as to suppress rotation speed variation of the motor which drives periodic load. Therefore, the motor is prevented from occurrence of irregular stop by weakening the torque control prior to the saturation of the voltage, and the torque control can be carried out up to the limit of the inverter even when the motor rotates at high speed.

When the motor control method of the second aspect of the present invention is employed, the method detects the output voltage value or command value of the inverter, and controls the voltage or current of the inverter based upon the detection value so that the output voltage value or command value of the inverter does not exceed the predetermined value, taking precedence over suppression of rotation speed variation, when the voltage or current applied to the motor from the inverter is controlled so as to change motor output torque for suppressing rotation speed variation of the motor which drives periodic load. Therefore, the motor is prevented from occurrence of irregular stop by weakening the torque control prior to the saturation of the voltage, and the torque control can be carried out up to the limit of the inverter even when the motor rotates at high speed.

When the motor control method of the third aspect of the present invention is employed, the method employs the peak value of the output voltage value of the inverter or the command value as the detection value. Therefore, operation and effect similar to those of the first aspect or the second aspect can be realized.

When the motor control method of the fourth aspect of the present invention is employed, the method decreases the amplitude of the output torque variation of the motor, and controls the voltage or current of the inverter so that the output voltage value or command value of the inverter does not exceed the predetermined value, when the voltage or current applied to the motor from the inverter is controlled so as to change motor output torque for suppressing rotation speed variation of the motor which drives periodic load. Therefore, the motor is prevented from occurrence of irregular stop by weakening the torque control prior to the saturation of the voltage, and the torque control can be carried out up to the limit of the inverter even when the motor rotates at high speed.

When the motor control method of the fifth aspect of the present invention is employed, the method detects the current of the inverter using current detection means, and controls the voltage or current of the inverter based upon the current detection value so as not to exceed the current detection extent, when the voltage or current applied to the motor from the inverter is controlled so as to suppress rotation speed variation of the motor which drives periodic load. Therefore, the motor is prevented from occurrence of irregular stop by weakening the torque control prior to the current exceeding the detection extent of the current detection means.

When the motor control method of the sixth aspect of the present invention is employed, the method detects the current of the inverter using current detection means, and controls the voltage or current of the inverter based upon the current detection value so as not to exceed the current detection extent, for driving the motor, when the voltage or current applied to the motor from the inverter is controlled so as to change motor output torque for suppressing rotation speed variation of the motor which drives periodic load. Therefore, the motor is prevented from occurrence of irregular stop by weakening the torque control prior to the current exceeding the detection extent of the current detection means.

When the motor control method of the seventh aspect of the present invention is employed, the method decreases the amplitude of the output torque variation of the motor, and controls the voltage or current of the inverter so as not to exceed the current detection extent, when the voltage or current applied to the motor from the inverter is controlled so as to change motor output torque for suppressing rotation speed variation of the motor which drives periodic load. Therefore, the motor is prevented from occurrence of irregular stop by weakening the torque control prior to the current exceeding the detection extent of the current detection means.

When the motor control method of the eighth aspect of the present invention is employed, the method indirectly detects the output current of the inverter by detecting the input current of the inverter using the current detection means, and controls the voltage or current of the inverter so that the peak value of the input current of the inverter in negative side does not exceed a predetermined value. Therefore, the detection accuracy of the current sensor can be minimized, the detection accuracy can be improved, and the capacity of the current sensor can be decreased and the cost of the current sensor can be decreased by narrowing the current detection extent. Also, operation and effect similar to those of one of the fifth to seventh aspects can be realized.

When the motor control method of the ninth aspect of the present invention is employed, the method detects or estimates load, and does not suppress rotation speed variation of the motor in correspondence with the load being smaller than the predetermined value, when the voltage or current applied to the motor from the inverter is controlled so as to change motor output torque for suppressing rotation speed variation of the motor which drives periodic load. Therefore, stability and efficiency when the load is light can be improved.

When the motor control method of the tenth aspect of the present invention is employed, the method detects or estimates load by means of the average current. Therefore, operation and effect similar to those of the ninth aspect can be realized.

When the motor control method of the eleventh aspect of the present invention is employed, the method detects the output voltage value or command value of the inverter, and controls the voltage or current of the inverter based upon the detection value so that the output voltage value or command value of the inverter does not exceed the predetermined value, when the converter is provided which can control the direct current voltage which is supplied to the inverter, and when the voltage or current applied to the motor from the inverter is controlled so as to change motor output torque for suppressing rotation speed variation of the motor which drives periodic load.

Therefore, the direct current voltage of the inverter can be determined to be a minimum voltage, and consequently the motor is prevented from occurrence of irregular stop even when the input voltage is lowered.

When the motor control method of the twelfth aspect of the present invention is employed, the method controls the direct current voltage supplied to the inverter based upon the detection value. Therefore, efficiency of the converter, inverter and motor can be improved, and affection due to the dead time can be reduced. Also, operation and effect similar to those of the eleventh aspect can be realized.

When the motor control apparatus of the thirteenth aspect of the present invention is employed, the apparatus detects the output voltage value or command value of the inverter using the detection means, and controls the voltage or current of the inverter based upon the detection value so that the output voltage value or command value of the inverter does not exceed the predetermined value, when the voltage or current applied to the motor from the inverter is controlled so as to suppress rotation speed variation of the motor which drives periodic load.

Therefore, the motor is prevented from occurrence of irregular stop by weakening the torque control prior to the saturation of the voltage, and the torque control can be carried out up to the limit of the inverter even when the motor rotates at high speed.

When the motor control apparatus of the fourteenth aspect of the present invention is employed, the apparatus detects the output voltage value or command value of the inverter using the detection means, and controls the voltage or current of the inverter based upon the detection value so that the output voltage value or command value of the inverter does not exceed the predetermined value using the inverter control means, taking precedence over suppression of rotation speed variation, when the voltage or current applied to the motor from the inverter is controlled so as to change motor output torque for suppressing rotation speed variation of the motor which drives periodic load.

Therefore, the motor is prevented from occurrence of irregular stop by weakening the torque control prior to the saturation of the voltage, and the torque control can be carried out up to the limit of the inverter even when the motor rotates at high speed.

When the motor control apparatus of the fifteenth aspect of the present invention is employed, the apparatus employs the peak value of the output voltage value of the inverter or the command value as the detection value. Therefore, operation and effect similar to those of the thirteenth aspect or fourteenth aspect can be realized.

When the motor control apparatus of the sixteenth aspect of the present invention is employed, the apparatus decreases the amplitude of the output torque variation of the motor, and controls the voltage or current of the inverter so that the output voltage value or command value of the inverter does not exceed the predetermined value, using the inverter control means, when the voltage or current applied to the motor from the inverter is controlled so as to change motor output torque for suppressing rotation speed variation of the motor which drives periodic load.

Therefore, the motor is prevented from occurrence of irregular stop by weakening the torque control prior to the saturation of the voltage, and the torque control can be carried out up to the limit of the inverter even when the motor rotates at high speed.

When the motor control apparatus of the seventeenth aspect of the present invention is employed, the apparatus detects the current of the inverter using current detection means, and controls the voltage or current of the inverter based upon the current detection value so as not to exceed the current detection extent using the inverter control means, when the voltage or current applied to the motor from the inverter is controlled so as to suppress rotation speed variation of the motor which drives periodic load.

Therefore, the motor is prevented from occurrence of irregular stop by weakening the torque control prior to the saturation of the voltage.

When the motor control apparatus of the eighteenth aspect of the present invention is employed, the apparatus detects the current of the inverter using current detection means, and controls the voltage or current of the inverter based upon the current detection value so as not to exceed the current detection extent using the inverter control means, for driving the motor, when the voltage or current applied to the motor from the inverter is controlled so as to change motor output torque for suppressing rotation speed variation of the motor which drives periodic load.

Therefore, the motor is prevented from occurrence of irregular stop by weakening the torque control prior to the current exceeding the detection extent of the current detection means.

When the motor control apparatus of the nineteenth aspect of the present invention is employed, the apparatus decreases the amplitude of the output torque variation of the motor, and controls the voltage or current of the inverter so as not to exceed the current detection extent using the inverter control means, when the voltage or current applied to the motor from the inverter is controlled so as to change motor output torque for suppressing rotation speed variation of the motor which drives periodic load.

Therefore, the motor is prevented from occurrence of irregular stop by weakening the torque control prior to the current exceeding the detection extent of the current detection means.

When the motor control apparatus of the twentieth aspect of the present invention is employed, the apparatus employs means for indirectly detecting the output current of the inverter by detecting the input current of the inverter as the current detection means, and employs means for controlling a voltage or current of the inverter so that the peak value of the input current of the inverter in negative side does not exceed the predetermined value as the inverter control means. Therefore, the detection accuracy of the current sensor can be minimized, the detection accuracy can be improved, and the capacity of the current sensor can be decreased and the cost of the current sensor can be decreased by narrowing the current detection extent. Also, operation and effect similar to those of one of the seventeenth to nineteenth aspects can be realized.

When the motor control apparatus of the twenty-first aspect of the present invention is employed, the apparatus detects or estimates load using the load detection means, and does not suppress rotation speed variation of the motor in correspondence with the load being smaller than the predetermined value using the inverter control means, when the voltage or current applied to the motor from the inverter is controlled so as to change motor output torque for suppressing rotation speed variation of the motor which drives periodic load.

Therefore, stability and efficiency when the load is light can be improved.

When the motor control apparatus of the twenty-second aspect of the present invention is employed, the apparatus employs means for detecting or estimating load by means of the average current as the load detection means. Therefore, operation and effect similar to those of the twenty-first aspect can be realized.

When the motor control apparatus of the twenty-third aspect of the present invention is employed, the apparatus detects the output voltage value or command value of the inverter using the detection means, and controls the voltage or current of the inverter based upon the detection value so that the output voltage value or command value of the inverter does not exceed the predetermined value using the inverter control means, when the converter is provided which can control a direct current voltage which is supplied to the inverter, and when the voltage or current applied to the motor from the inverter so as to change motor output torque for suppressing rotation speed variation of the motor which drives periodic load.

Therefore, the direct current voltage of the inverter can be determined to be a minimum voltage, and consequently the motor is prevented from occurrence of irregular stop even when the input voltage is lowered.

When the motor control apparatus of the twenty-fourth aspect of the present invention is employed, the apparatus further comprises direct current voltage control means for controlling the direct current voltage supplied to the inverter based upon the detection value. Therefore, efficiency of the converter, inverter and motor can be improved, and affection due to the dead time can be reduced. Also, operation and effect similar to those of the twenty-third aspect can be realized.

DETAILED DESCRIPTION OF THE PREFERRED EMBODIMENTS

Figure 1:
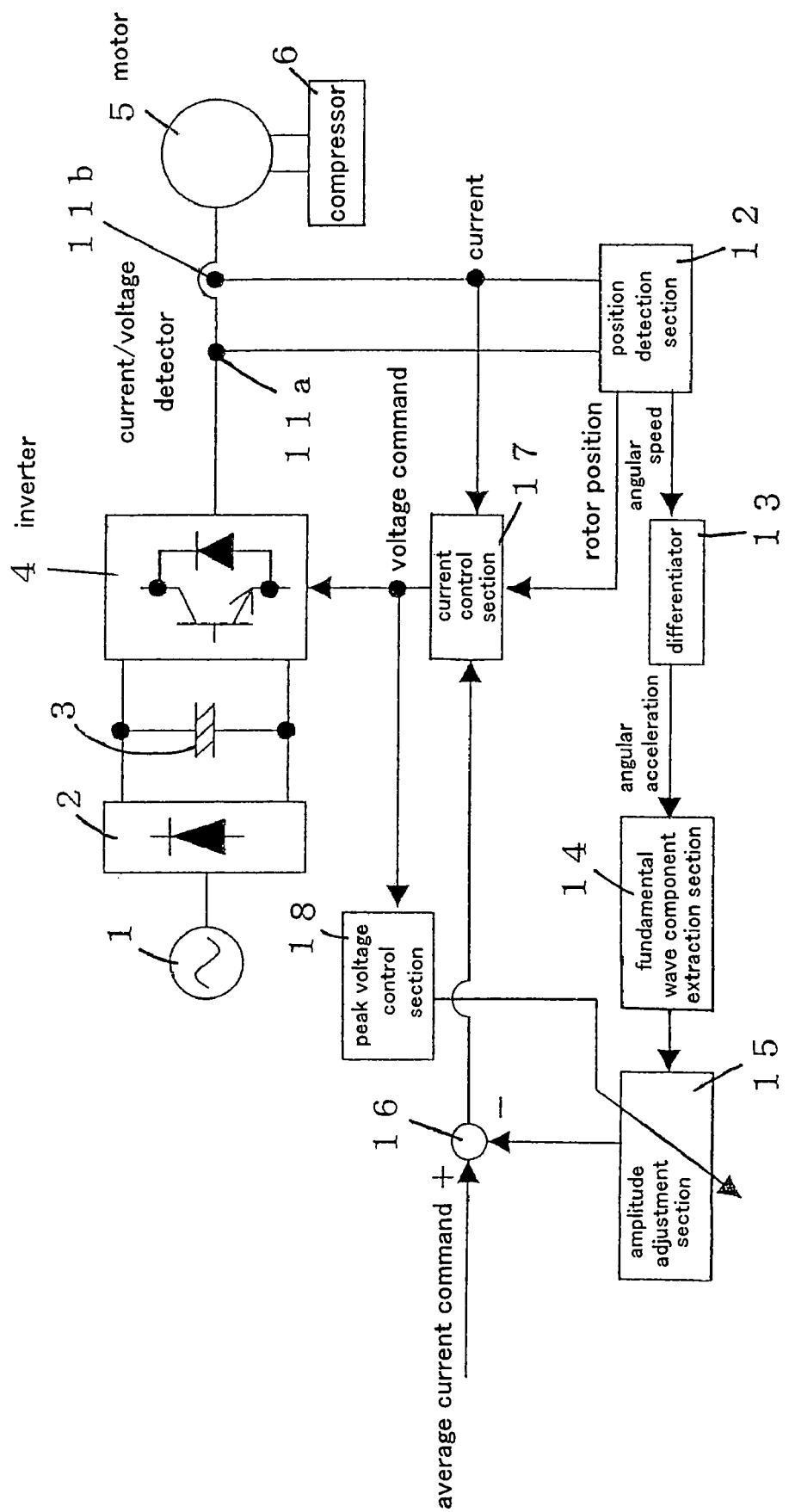
FIG. 1 is a block diagram showing a motor control apparatus of an embodiment according to the present invention.

Hereinafter, referring to the attached drawings, we explain embodiments of a motor control method and apparatus thereof according to the present invention, in detail. FIG. 1 is a block diagram showing a motor control apparatus of an embodiment according to the present invention.

This motor control apparatus obtains a direct current power source by applying an alternate current power source 1 to a converter 2, smoothens the obtained direct current power source using a smoothing condenser 3, converts the smoothened direct current power source into an alternating current power source using an inverter 4, and supplies the converted alternating current power source to a motor 5. And, this motor 5 drives a compressor 6.

A voltage and current supplied to the motor 5 are detected using a voltage detector 11a and current detector 11b, and the detected voltage and current are supplied to a position detection section 12. An angular speed output from this position detection section 12 is supplied to a differentiator 13 so as to output an angular acceleration. A fundamental wave component extraction section 14 extracts a fundamental wave component of the angular acceleration, and supplies the fundamental wave component to an amplitude adjustment section 15. A subtraction section 16 subtracts the output of the amplitude adjustment section 15 from an average current command. This subtraction result, current detection value, and the rotor position from the position detection section 12 are supplied to a current control section 17 so as to carry out the current control operation, and a voltage command is supplied to the inverter 4. This voltage command is supplied to a peak voltage control section 18, and the output from the peak voltage control section 18 is supplied to the amplitude adjustment section 15 as an adjustment command.

The compressor 6 has periodic load variation of about once or twice per 1 rotation. Motors of various configurations can be employed as the motor 5.

The position detection section 12 calculates a rotational position, and rotational angular speed of a rotor using the voltage, current, magnetic flux, and equipment constants such as d-axis and q-axis inductances (Ld, Lq) of the motor 5.

The differentiator 13b differentiates the angular speed so as to calculate the angular acceleration.

The fundamental wave component extraction section 14 extracts the fundamental wave component of the angular acceleration. Therefore, an angular acceleration variation having a frequency same to that of a motor rotation speed is extracted and output as the output of the fundamental wave component extraction section 14 when the load change of the compressor 6 is once per 1 rotation of the motor. While an angular acceleration variation having a frequency twice to that of a motor rotation speed is extracted and output as the output of the fundamental wave component extraction section 14 when the load change of the compressor 6 is twice per 1 rotation of the motor.

The amplitude adjustment section 15 amplifies the fundamental wave component of the angular acceleration and outputs the amplification result. In the amplitude adjustment section 15, a gain is determined to be infinite by typically integrating the amplitude of the fundamental wave component or the like. And, the gain is lowered by carrying out processing such that a constant proportional value is removed from the integration value, for example, in response to the supplying of the adjustment command.

The peak voltage control section 18 detects the peak voltage of the voltage command, and outputs the adjustment command instructing the amplitude adjustment section 15 to suppress the amplitude when the peak voltage possibly exceed the previously determined value which is determined with respect to the maximum output voltage or maximum modulation rate of the inverter (specifically, when the peak voltage exceed a value which is slightly smaller than this previously determined value, for example).

Instead the peak voltage control section 18, a device can be employed which detects the output voltage value or voltage command value of the inverter 4, and supplies the adjustment command to the amplitude adjustment section 15 based upon the detection value so that the output voltage value or voltage command value of the inverter 4 does not exceed the predetermined value.

Figure 2:
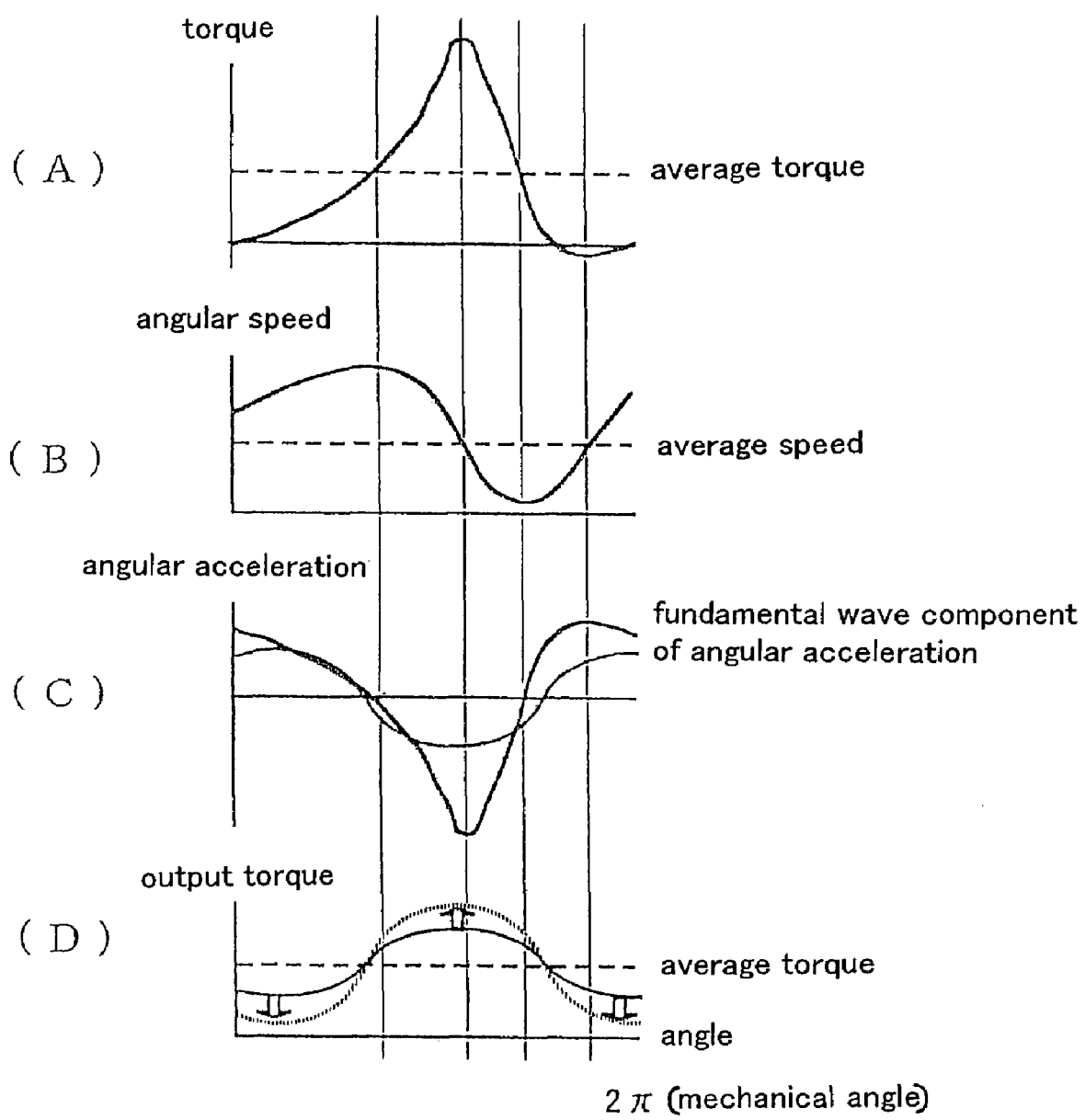
FIGS. 2(A)-2(D) are diagrams each showing a waveform of each section.

Referring to the waveform of each section illustrated in FIGS. 2(A)-2(D), description is made further. FIG. 2(A) illustrates an axial torque of a 1-cylinder compressor, FIG. 2(B) illustrates an angular speed of a motor when the motor is driven with an average torque, FIG. 2(C) illustrates an angular acceleration of the motor, and FIG. 2(D) illustrates a motor output torque when the control of FIG. 1 is carried out. In these Figures, the horizontal axis represents a rotation angle (mechanical angle) of the rotor. Description is made for a case where the gain of the amplitude adjustment section 15 is determined to be infinite.

When the motor is driven with the average torque {refer to dashed lines of FIGS. 2(A) and 2(D)}, and when the axial torque of the compressor is greater than the average torque, the motor is decelerated, on the contrary when the axial torque of the compressor is smaller than the average torque, the motor is accelerated. Consequently, the angular acceleration will schematically be in the form which is reversed in up and down of the compression torque, and the fundamental wave component of the angular acceleration will be in the form illustrated in FIG. 2(C). Therefore, the fundamental wave component of the speed variation can be reduced by varying the output torque of the motor in reversed phase with respect to the fundamental wave component of the angular acceleration. When the amplitude sufficient for canceling the fundamental wave component of the speed variation is not obtained for the motor output torque, as illustrated by the dashed line in FIG. 2(D), the fundamental wave component of the angular acceleration still remains. Therefore, the adjustment is carried out in the amplitude adjustment section so as to output greater amplitude. Consequently, the apparatus becomes stable with the amplitude which makes the fundamental wave component of the angular acceleration to be 0.

Even when the phase of the output torque and the phase of the angular acceleration are slightly shifted from one another due to some delay, the fundamental wave component of the angular acceleration is detected due to the residual torque between the compressor axial torque and the motor output torque, and the control is carried out for canceling the fundamental wave component. Therefore, the fundamental wave component of the angular acceleration is controlled to be 0, finally. The fundamental wave component of the speed variation can be reduced using such control, therefore vibration can effectively be reduced.

In the embodiment of FIG. 1, the fundamental wave component is overlapped to the current command. It is possible that the fundamental wave component is directly overlapped to the voltage command for the control having no current control, because the slight shifting and the like can be ignored by the feedback control as is described above. It is of course effective that the fundamental wave component is overlapped to the torque command for the control having the torque command in the interior thereof. When using this control, the control delay and the like are hardly affected because only the fundamental wave component is reduced. Therefore, more stable control can be realized in comparison to the repetition control and the like which are known from the past. When a compressor and the like are to be driven, a sufficient vibration suppression effect is obtained by only the reduction of the fundamental wave component.

In the above description, only fundamental wave component is the target of the control. But, it is apparent that the higher-order such as second-order of angular acceleration component is extracted in addition to the fundamental wave component, and the control is carried out for canceling the torque variation. In this case, disadvantages arise in that the control becomes complicated, and that the possibility of divergence is raised, while the vibration suppression ability is not improved so much. Therefore, it is required that the higher-order component is selected which should be the object for the control based upon the trade-off with the required specification.

In the embodiment of FIG. 1, the gain of the amplitude adjustment section 15 can be lowered by the adjustment command from the peak voltage control section 18 so that the fundamental wave component of the angular acceleration does not become 0, but the rotation speed variation can be suppressed within the voltage possible to be output from the inverter 4. Therefore, the motor 5 can be driven without the generation of the disadvantage such that the voltage command exceeds the maximum output voltage or maximum modulation rate of the inverter so that the control diverges.

Figure 3:
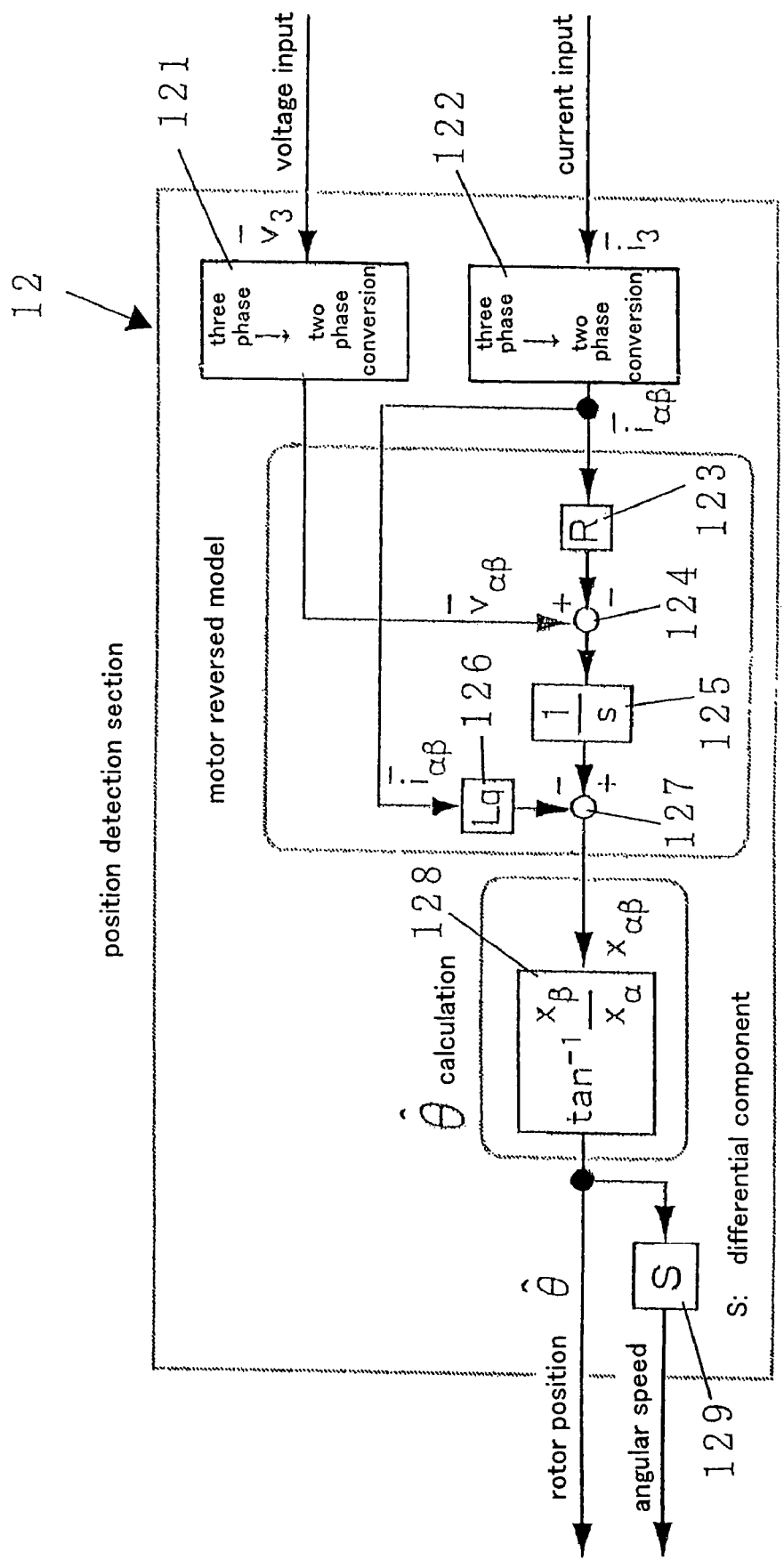
FIG. 3 is a block diagram showing an example of a position detection section.

FIG. 3 is a block diagram illustrating an example of the position detection section. The position detection section comprises a first conversion section 121 which receives the detection voltages for three-phases and converts them into voltages for two-phases, a second conversion section 122 which receives the detection currents for three-phases and converts them into currents for two-phases, a voltage drop calculation section 123 for calculating a voltage drop due to winding resistance R, a first subtraction section 124 for subtracting the calculated voltage drop from the voltages for two-phases, an integration section 125 for integrating the subtraction result by the first subtraction section 124, a flux calculation section 126 for calculating flux due to q-axis inductance Lq, a second subtraction section 127 for subtracting the calculated flux from the integration result, a rotor position calculation section 128 for calculating the rotor position from the subtraction result by the second subtraction section 127, and a differentiation section 129 for differentiating the rotor position so as to calculate the angular speed.

A position detection section having other configuration can be employed.

Figure 4:
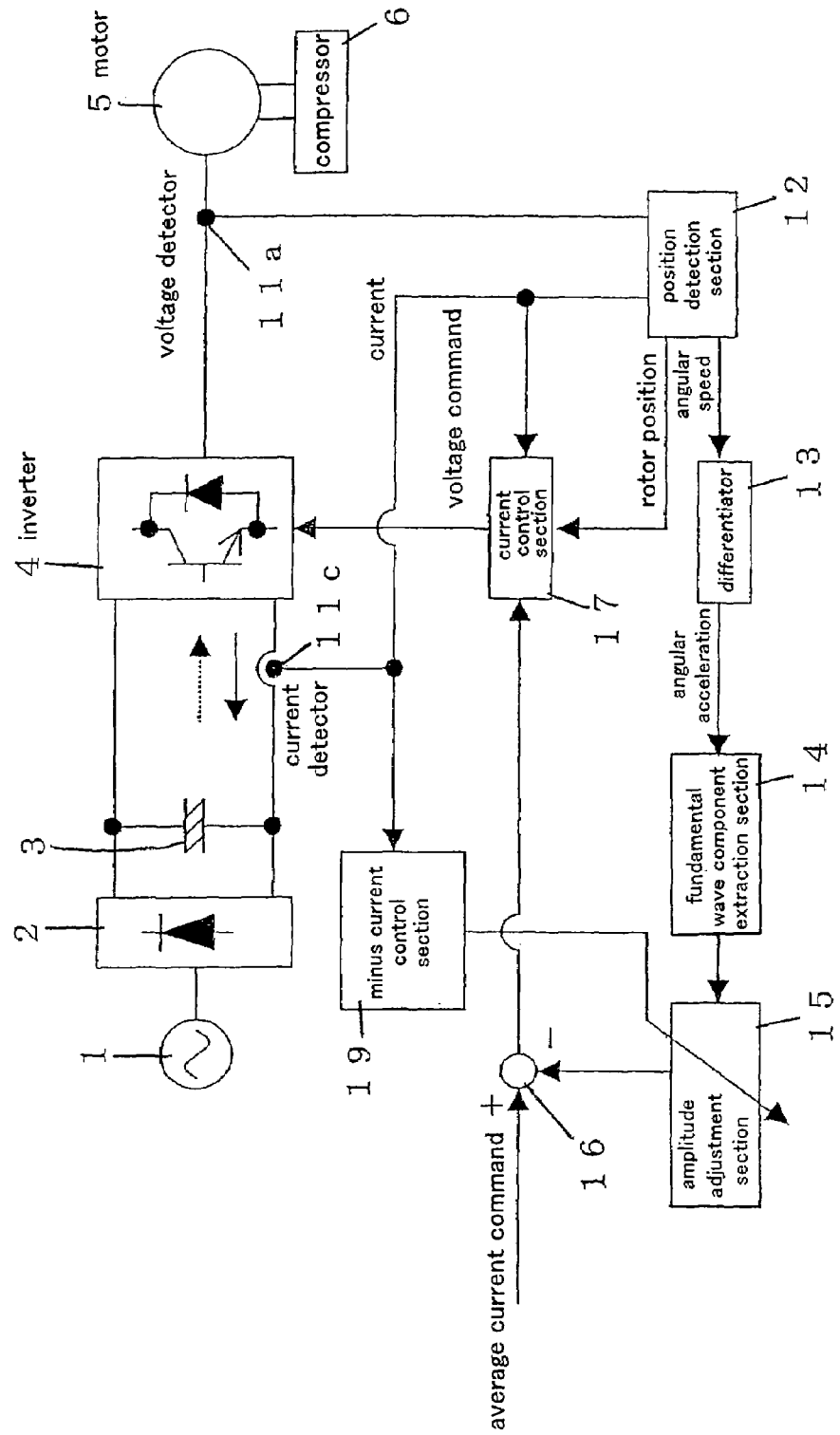
FIG. 4 is a block diagram showing a motor control apparatus of another embodiment according to the present invention.

FIG. 4 is a block diagram illustrating a motor control apparatus of another embodiment according to the present invention.

This motor control apparatus differs from the motor control apparatus of FIG. 1 only in that a current detection section 11*c* for detecting the input current of the inverter 4 is employed instead the current detection section 11*b*, and that a minus current control section 19 for receiving the input current of the inverter 4 and for generating the adjustment command, and for supplying the adjustment command to the amplitude adjustment section 15, is employed instead the peak voltage control section 18.

The input current of the inverter 4 almost flows in the solid line arrow direction illustrated in FIG. 4 (plus current flows), but the current may flow in the dashed line arrow direction (minus current flows) when the power factor of the motor 5 is lower, or when the torque variation amount of the motor 5 is greater. Therefore, the current detection section 11*c* should be detectable not only the plus current but also the minus current. When the detection extent for plus current and the detection extent for minus current are determined to be similar to one another, the detection extent for minus current becomes wider than the necessity so that the detection accuracy becomes worse. By taking this into consideration, the detection extent can be made to be narrower so that the detection accuracy can be improved, by making the detection extent for minus current narrower than the detection extent for plus current. When the torque variation amount is greater, the input current deviates the detection extent for minus current so that a disadvantage arises in that a situation where the input current cannot be detected, the control diverges, and the motor 5 stops. Accordingly, a minus current control section 19 is provided, the minus current value or the peak value of the minus current is detected at the minus current control section 19, and a command for suppressing the amplitude is output to the amplitude adjustment section 15 when the minus current value or the peak value of the minus current seems to exceed the value previously determined with respect to the current detection extent (specifically, when the minus current value or the peak value of the minus current exceeds a value which is slightly smaller in absolute value than the previously determined value, for example). Upon receipt of this command, the amplitude adjustment section 15 carries out processing for lowering the gain by removing a constant proportional value from the integration value or the like, the amplitude adjustment section 15 having realized the gain of infinity using integration or the like so as to make the fundamental wave component of the angular acceleration to be 0.

Therefore, the fundamental wave component of the angular acceleration does not become 0. But, the rotation speed variation can be suppressed within the extent where the current can be detected, so that the motor 5 can be driven and the current detection accuracy can be improved without divergence of the control due to the current deviating the current detection extent so as to result the motor to be stopped which is generated in the past.

Figure 5:
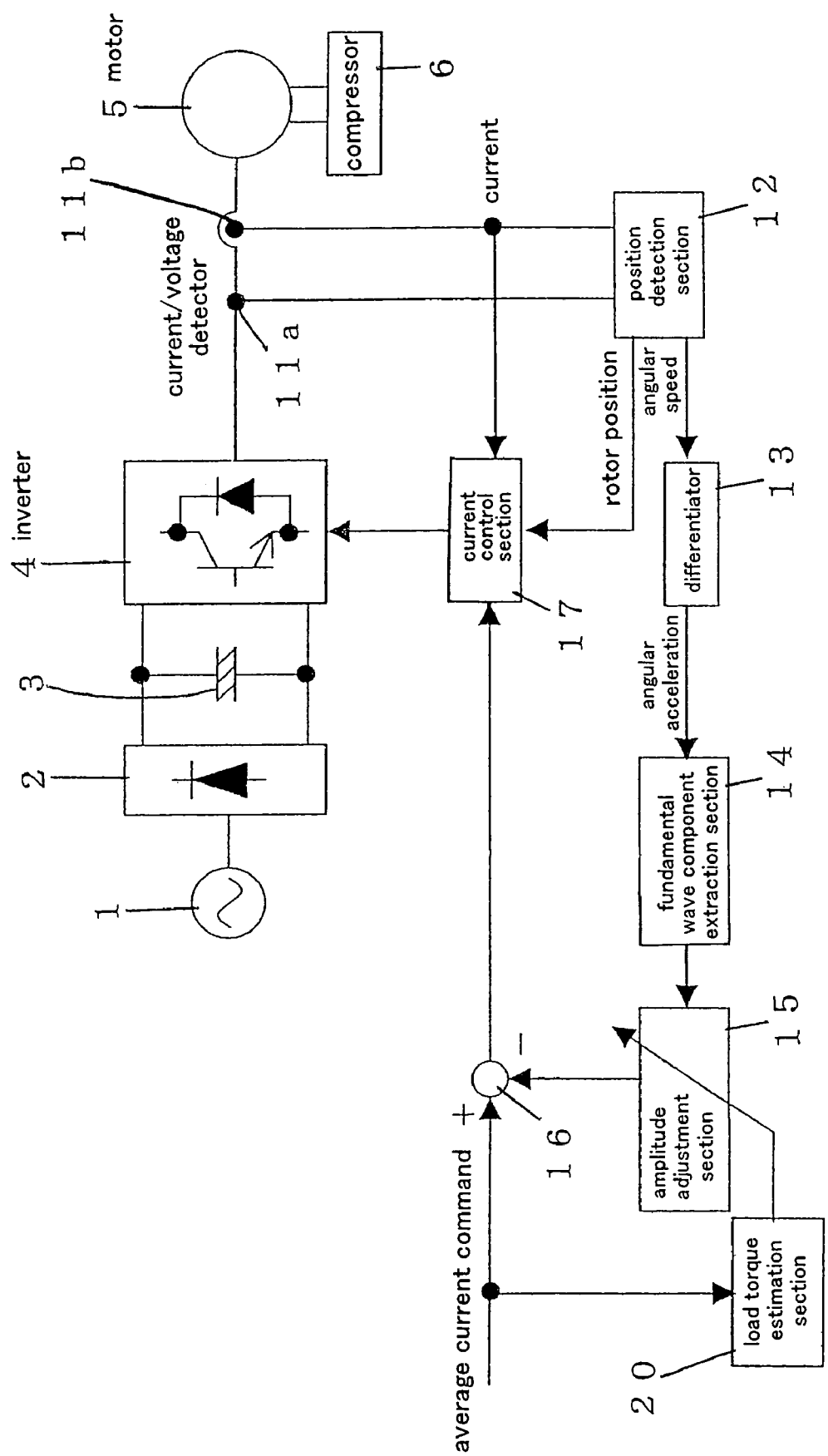
FIG. 5 is a block diagram showing a motor control apparatus of a further embodiment according to the present invention.

FIG. 5 is a block diagram illustrating a motor control apparatus of a further embodiment according to the present invention.

This motor control apparatus is different from the motor control apparatus of FIG. 1 only in that the peak voltage control section 18 is omitted and a load torque estimation section 20 is provided.

This load torque estimation section 20 receives the average current command, for example, and estimates the load torque. The load torque estimation section 20 supplies a command to the amplitude adjustment section 15, the command instructing to make the amplitude to be 0, in response that the estimated torque becomes smaller than a predetermined value. It is of course possible that the load torque is estimated from a value other than the average current command.

In response to the receipt of this command, the amplitude adjustment section 15 carries out processing for lowering the gain by removing a constant proportional value from the integration value or the like, the amplitude adjustment section 15 having realized the gain of infinity using integration or the like so as to make the fundamental wave component of the angular acceleration to be 0.

Therefore, the fundamental wave component of the angular acceleration does not become 0. But, no problem arises for vibration and the efficiency is improved because the load is light. Especially, for a case where the speed is low, the affection is made due to the dead time, the current control, sensor-less position detection and the like become unstable when the torque variation is greater. But, the stability of the current control, sensor-less position detection and the like can be improved by determining the output of the amplitude adjustment section 15 to be 0.

Figure 6:
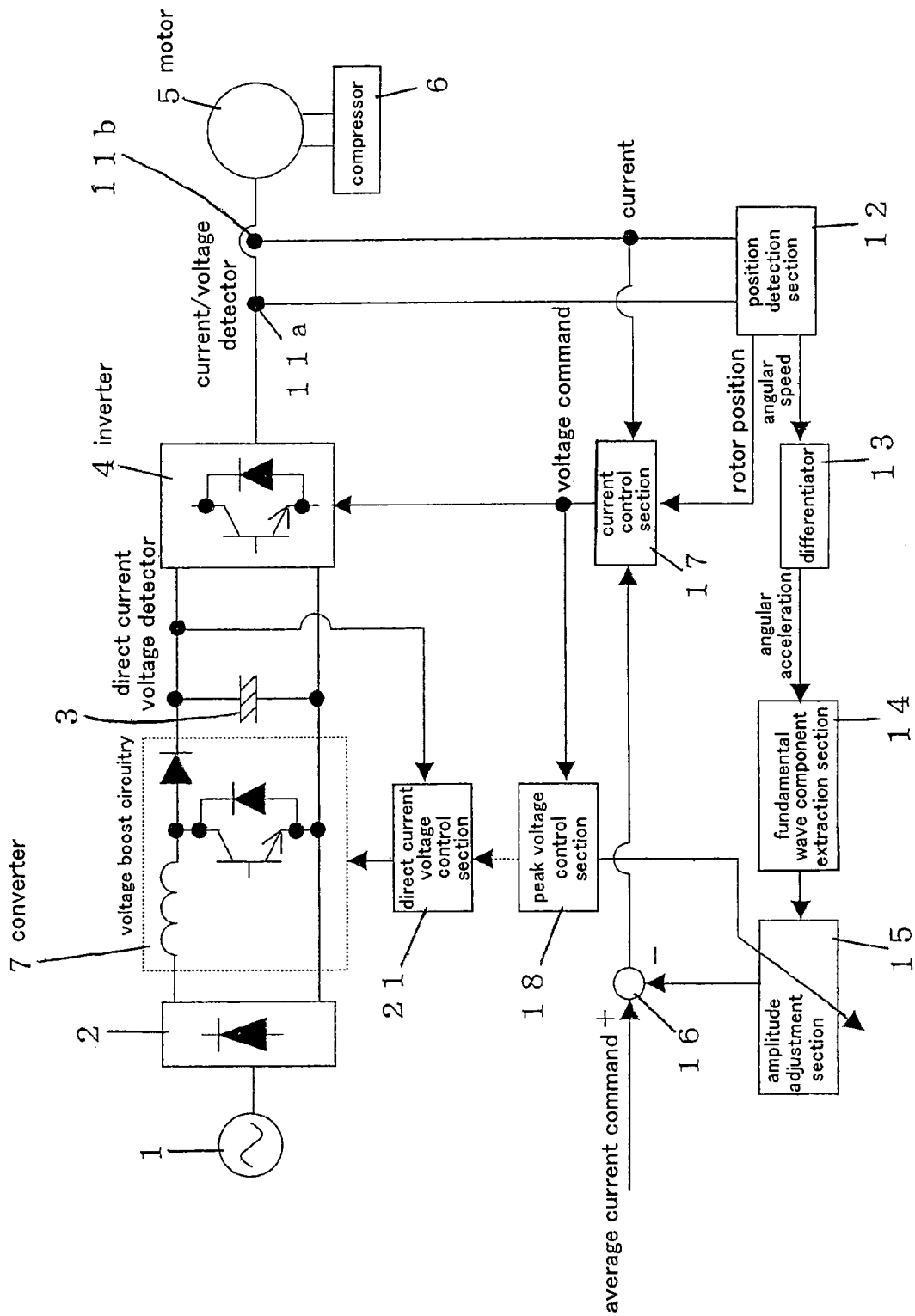
FIG. 6 is a block diagram showing a motor control apparatus of a further embodiment according to the present invention.

FIG. 6 is a block diagram illustrating a motor control apparatus of a further embodiment according to the present invention.

This motor control apparatus is different from the motor control apparatus of FIG. 1 in that a converter (voltage boost circuitry) 7 is provided between the rectification circuitry 2 and the smoothing condenser 3, that a direct current voltage detection section 11d for detecting the voltage of the direct current section of the inverter 4 is further provided, and that a direct current voltage control section 21 is further provided which receives the output of the peak voltage control section 18 and the output of the direct current voltage detection section 11d and outputs a control command for the converter 7.

When this embodiment is employed, as is similar to the embodiment of FIG. 1, the peak voltage of the voltage command is detected by the peak voltage control section 18, and the command instructing the amplitude adjustment section 15 to suppress the amplitude when the peak voltage is going to exceed the value previously determined with respect to the maximum output voltage or maximum modulation rate of the inverter which is determined based upon the direct current voltage. Upon receipt of this command, the amplitude adjustment section 15 carries out processing for lowering the gain by removing a constant proportional value from the integration value or the like, the amplitude adjustment section 15 having realized the gain of infinity (?) using integration or the like so as to make the fundamental wave component of the angular acceleration to be 0.

Therefore, the fundamental wave component of the angular acceleration does not become 0. But, the rotation speed variation can be suppressed within the extent of the voltage which can be output from the inverter, so that the motor 5 can be driven and the current detection accuracy can be improved without divergence of the control due to the exceeding of the voltage command over the maximum output voltage or maximum modulation rate of the inverter which is generated in the past.

Even when the direct current voltage controlled by the direct current voltage control section 21 is lower than a voltage required for sufficiently suppressing the rotation speed variation, the motor 5 can be driven without problems. When the direct current voltage can sufficiently raised, and under a condition that the control response of the direct current control is slow so that the direct current voltage is short temporarily, the motor 5 can be driven without problems. Therefore, the direct current voltage can freely be determined based upon various factors such as vibration, efficiency which are the target of the control.

The following control can be carried out. At the peak voltage control section 18, the peak voltage of the voltage command is detected, the command for raising the direct current voltage is supplied to the direct current control section 21 when the peak voltage is going to exceed a value previously determined with respect to the maximum output voltage or maximum modulation rate of the inverter 4, while the command for lowering the direct current voltage when the peak voltage is not going to exceed a value previously determined with respect to the maximum output voltage or maximum modulation rate of the inverter 4. Upon receipt of the command, the direct current voltage is controlled at the direct current voltage control section 21 so as to lower the direct current voltage to proximate of the limit, consequently the rotation speed variation can greatly suppressed. In this case, the converter efficiency can be improved by lowering the boosting ratio as low as possible. The efficiency of the inverter 4, and motor 5 can be improved because the direct current voltage is low. Affection of the dead time to the sensor-less position detection and current control can be decreased because the pulse width of the inverter can be made wider.

Each of the embodiments is described as being implemented by hardware. It is of course possible that they can be implemented by software.

What is claimed is:

1. A motor control method for controlling at least one of voltage and current applied to a motor, which drives a periodic load, from an inverter for varying motor output torque in reversed phase with respect to the fundamental wave component of an angular acceleration of the motor, the method comprising the steps of:
   detecting at least one of an output voltage value and a voltage command value of the inverter as a detection value; and
   controlling at least one of voltage and current of the inverter to suppress periodic rotational speed variations of the motor that result from the periodic load based upon the detection value so that one of the output voltage value and voltage command value of the inverter does not exceed a predetermined value, taking precedence over suppression of the rotational speed variations.

2. A motor control method as set forth in claim 1, wherein the detection value is a peak value of one of the output voltage value of the inverter and the voltage command value.

3. The motor control method as set forth in claim 1, wherein
   the inverter varies output torque, and
   a converter is provided which can control a direct current voltage supplied to the inverter.

4. A motor control method as set forth in claim 3, wherein the direct current voltage supplied to the inverter is controlled based upon the detection value.

5. The motor control method as set forth in claim 3, wherein
   the controlling at least one of voltage and current of the inverter is accompanied with a decrease of an amplitude of an output torque variation of the motor.

6. A motor control method for controlling at least one of voltage and current applied to a motor, which drives a periodic load, from an inverter for varying motor output torque in reversed phase with respect to the fundamental wave component of an angular acceleration of the motor, the method comprising the steps of:
   decreasing an amplitude of an output torque variation of the motor; and
   controlling at least one of voltage and current of the inverter to suppress periodic rotational speed variations of the motor that result from the periodic load so that at least one of the output voltage value and the voltage command value of the inverter does not exceed a predetermined value.

7. A motor control method for controlling at least one of voltage and current applied to a motor, which drives a periodic load, from an inverter for varying motor output torque in reversed phase with respect to the fundamental wave component of an angular acceleration of the motor, the method comprising the steps of:
   decreasing an amplitude of an output torque variation of the motor; and
   controlling at least one of voltage and current of the inverter to suppress periodic rotational speed variations of the motor that result from the periodic load so as not to exceed a current detection extent.

8. A motor control method for controlling at least one of voltage and current applied to a motor from an inverter for varying motor output torque so as to suppress rotational speed variations of the motor which drives a periodic load, the method comprising the steps of:
   decreasing an amplitude of an output torque variation of the motor; and
   controlling at least one of voltage and current of the inverter so as not to exceed a current detection extent,
   the output current of the inverter being indirectly detected by detecting an input current of the inverter using the current detection section with at least one of the voltage and the current of the inverter being controlled so that a negative peak value of an input current of the inverter does not exceed the predetermined value.

9. A motor control method for controlling at least one of voltage and current applied to a motor, which drives a periodic load, from an inverter for varying motor output torque in reversed phase with respect to the fundamental wave component of an angular acceleration of the motor, the method comprising the steps of:
   detecting or estimating load; and
   suppressing periodic rotational speed variations of the motor that result from the periodic load except when the load is smaller than a predetermined value.

10. A motor control method as set forth in claim 9, wherein the load is detected or estimated by an average current.

11. A motor control apparatus for controlling at least one of voltage and current applied to a motor, which drives a periodic load, from an inverter for varying motor output torque in reversed phase with respect to the fundamental wave component of an angular acceleration of the motor, the apparatus comprising:
    a detection section for detecting at least one of an output voltage value and a voltage command value of the inverter as a detection value; and
    an inverter control section for controlling at least one of voltage and current of the inverter to suppress periodic rotational speed variations of the motor that result from the periodic load based upon the detection value so that one of the output voltage value and the voltage command value of the inverter does not exceed a predetermined value, taking precedence over suppression of rotational speed variations.

12. A motor control apparatus as set forth in claim 11, wherein
    the detection value is a peak value of one of the output voltage value of the inverter or the voltage command value.

13. A motor control apparatus for controlling at least one of voltage and current applied to a motor, which drives a periodic load, from an inverter for varying motor output torque in reversed phase with respect to the fundamental wave component of an angular acceleration of the motor, the apparatus comprising:
    a section for decreasing an amplitude of an output torque variation of the motor; and
    an inverter control section for controlling at least one of voltage and current of the inverter to suppress periodic rotational speed variations of the motor that result from the periodic load so that one of an output voltage value and a voltage command value of the inverter does not exceed a predetermined value.

14. A motor control apparatus for controlling at least one of voltage and current applied to a motor, which drives a periodic load, from an inverter for varying motor output torque in reversed phase with respect to the fundamental wave component of an angular acceleration of the motor, the apparatus comprising:
    a section for decreasing an amplitude of an output torque variation of the motor; and
    an inverter control section for controlling at least one of voltage and current of the inverter to suppress periodic rotational speed variations of the motor that result from the periodic load so as not to exceed a current detection extent.

15. A motor control apparatus for controlling at least one of voltage and current applied to a motor from an inverter for varying motor output torque so as to suppress rotational speed variations of the motor which drives a periodic load, the apparatus comprising:
   a section for decreasing an amplitude of an output torque variation of the motor; and
   an inverter control section for controlling at least one of voltage and current of the inverter so as not to exceed a current detection extent,
   the current detection section indirectly detecting the output current of the inverter by detecting the input current of the inverter, and wherein the inverter control section controls at least one of voltage and current of the inverter so that a negative peak value of the input current of the inverter does not exceed a predetermined value.

16. A motor control apparatus for controlling at least one of voltage and current applied to a motor, which drives a periodic load, from an inverter for varying motor output torque in reversed phase with respect to the fundamental wave component of an angular acceleration of the motor, the apparatus comprising:
   a load detection section for detecting or estimating load; and
   an inverter control section for suppressing periodic rotational speed variations of the motor that result from the periodic load except when the load is smaller than a predetermined value.

17. A motor control apparatus as set forth in claim 16, wherein
   the load detection section detects or estimates load by an average current.

18. A motor control apparatus for controlling at least one of voltage and current applied to a motor, which drives a periodic load, from an inverter for varying motor output torque in reversed phase with respect to the fundamental wave component of an angular acceleration of the motor, wherein a converter is provided which can control a direct current voltage supplied to the inverter, the apparatus comprising:
   a detection section for detecting at least one of an output voltage value and a voltage command value of the inverter as a detection value;
   an inverter control section for controlling at least one of voltage and current of the inverter to suppress periodic rotational speed variations of the motor that result from the periodic load based upon the detection value so that one of the output voltage value and the voltage command value of the inverter does not exceed a predetermined value; and
   a direct current voltage control section for controlling the direct current voltage supplied to the inverter based upon the detection value.

19. The motor control apparatus as set forth in claim 18, wherein
   the inverter control section for controlling at least one of the voltage and current of said inverter is accompanied with a decrease of an amplitude of an output torque variation of the motor.

20. A motor control method for controlling at least one of voltage and current applied to a motor from an inverter for varying motor output torque so as to suppress rotational speed variations of the motor which drives a periodic load, the method comprising the steps of:
   detecting a current of the inverter as a current detection value using a current detection section for driving the motor; and
   controlling at least one of voltage and the current of the inverter based upon the current detection value so as not to exceed a current detection extent, for driving the motor,
   the output current of the inverter being indirectly detected by detecting an input current of the inverter using the current detection section with at least one of the voltage and the current of the inverter being controlled so that a negative peak value of an input current of the inverter does not exceed the predetermined value.

21. A motor control apparatus for controlling at least one of voltage and current applied to a motor from an inverter for varying motor output torque so as to suppress rotational speed variations of the motor which drives a periodic load, the apparatus comprising:
   a current detection section for detecting as a current detection value at least one of an input current and an output current of the inverter, for driving the motor; and
   an inverter control section for controlling at least one of voltage and current of the inverter based upon the current detection value so as not to exceed a current detection extent, for driving the motor,
   the current detection section indirectly detecting the output current of the inverter by detecting the input current of the inverter, and wherein the inverter control section controls at least one of voltage and current of the inverter so that a negative peak value of the input current of the inverter does not exceed a predetermined value.

* * * * *

UNITED STATES PATENT AND TRADEMARK OFFICE
CERTIFICATE OF CORRECTION

| | |
|---|---|
| PATENT NO. | : 7,579,800 B2 |
| APPLICATION NO. | : 10/530410 |
| DATED | : August 25, 2009 |
| INVENTOR(S) | : Nobuki Kitano |

It is certified that error appears in the above-identified patent and that said Letters Patent is hereby corrected as shown below:

On the Title page change the listing of [73] from

"[73]    Assignee:    Sumitomo Electric Industries, Ltd., Osaka (JP)"

to

-- [73]    Assignee:    Daikin Industries, Ltd., Osaka (JP) --

Signed and Sealed this
Twenty-sixth Day of July, 2011

David J. Kappos
*Director of the United States Patent and Trademark Office*